UNITED STATES PATENT OFFICE.

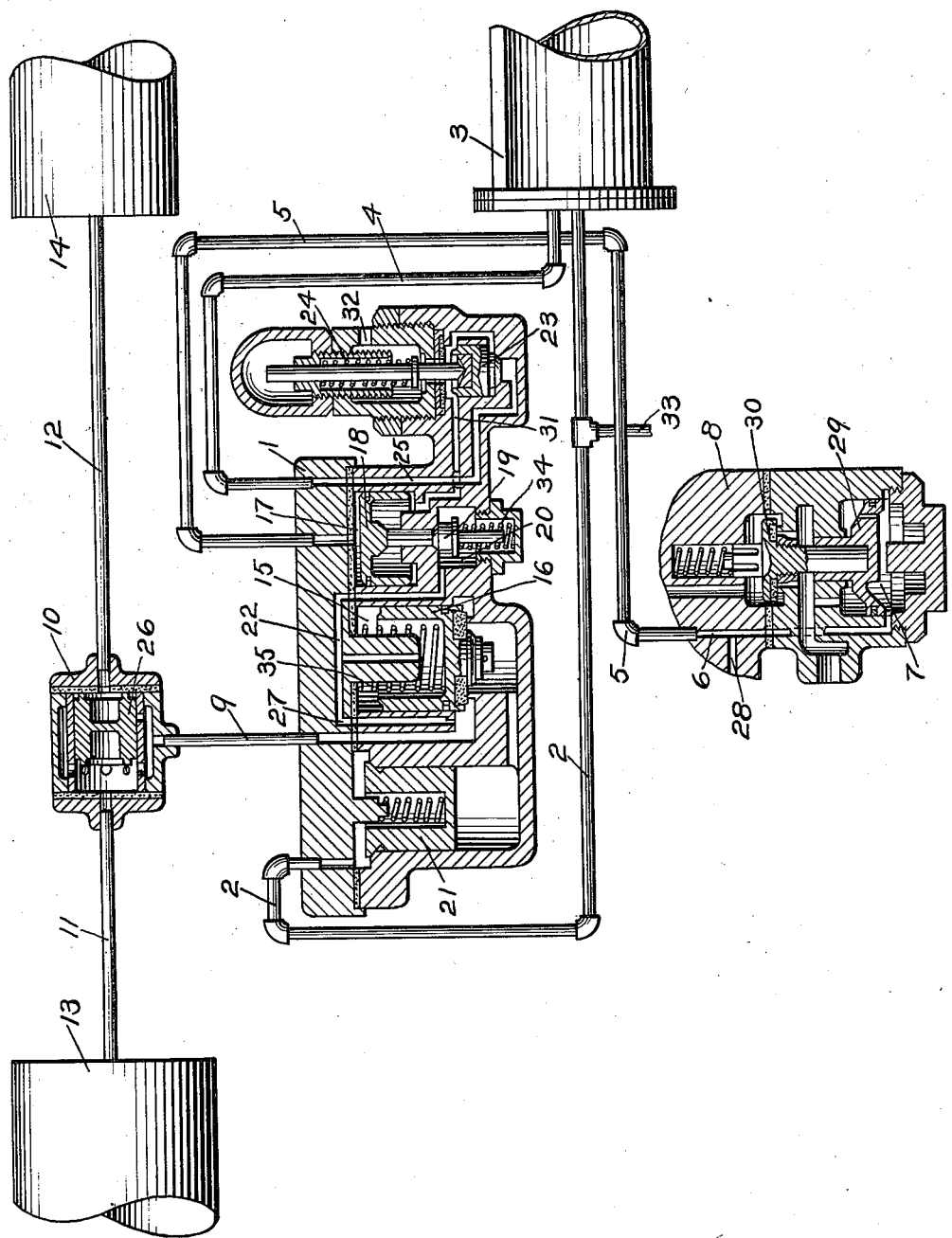

WALTER V. TURNER, OF EDGEWOOD, PENNSYLVANIA, ASSIGNOR TO THE WESTING-HOUSE AIR BRAKE COMPANY, OF WILMERDING, PENNSYLVANIA, A CORPORATION OF PENNSYLVANIA.

FLUID-PRESSURE BRAKE.

1,199,840.      Specification of Letters Patent.      Patented Oct. 3, 1916.

Application filed May 14, 1915. Serial No. 28,055.

*To all whom it may concern:*

Be it known that I, WALTER V. TURNER, a citizen of the United States, residing at Edgewood, in the county of Allegheny and State of Pennsylvania, have invented new and useful Improvements in Fluid-Pressure Brakes, of which the following is a specification.

This invention relates to fluid pressure brakes, and more particularly to a brake apparatus for controlling the supply of fluid under pressure to the brake cylinder in an emergency application of the brakes.

It is well known that different classes of railway service may employ different normal maximum brake pipe pressures, for example, in steam road service, a standard brake pipe pressure of 110 pounds may be carried, while in electric road service, the brake pipe pressure may be 90 pounds. Frequently, the same cars are employed in both classes of service and in such case, it is desirable to obtain the same maximum emergency braking power regardless of the brake pipe pressure which happens to be employed.

The principal object of my invention is therefore to provide means for securing the same maximum brake cylinder pressure in an emergency application of the brakes irrespective of the brake pipe pressure which may be employed.

In the accompanying drawing, the single figure is a diagrammatic view, mainly in section, of an equipment embodying my invention.

According to my invention, a by-pass and limiting valve device 1 is provided, having a brake cylinder supply pipe 2 leading to brake cylinder 3, a limiting pipe 4, also connected to the brake cylinder, a controlling pipe 5, leading to a passage 6 which communicates with the piston chamber 7 of a quick action valve device 8, and a reservoir pipe 9 leading to a double check valve device 10 which in turn is connected by respective pipes 11 and 12 to a main reservoir 13 and an emergency reservoir 14.

The by-pass and limiting valve device 1 may comprise a casing having a piston chamber 15 containing a brake cylinder supply valve piston 16 and a piston chamber 17 connected to pipe 5 and containing a piston 18 for operating a valve 19 contained in valve chamber 20. The valve piston 16 is adapted to control communication from the reservoir supply pipe 9 to brake cylinder supply pipe 2 and a check valve 21 may be interposed to prevent back flow from the brake cylinder.

Piston 18 is adapted to operate the valve 19 for venting fluid through a passage 22 from piston chamber 15 to effect the opening of the brake cylinder supply valve 16 and since the parts are intended to operate only in an emergency application of the brakes, the piston 18 is connected to some part of the brake apparatus which operates only in an emergency application of the brakes. For this purpose, the controlling pipe 5 may be connected to the piston chamber 7 of a quick action valve device 8. In order to effect the closing of the supply valve when the brake cylinder pressure has reached the desired predetermined maximum, a limiting valve device may be employed, comprising a double seating valve 23 subject to the pressure of an adjustable spring 24 on one side and to brake cylinder pressure on the opposite side, as supplied through pipe 4 and passage 25.

The double check valve device 10 may comprise a casing containing a double seating valve 26 adapted to be moved by the pressure in the supply reservoir which contains the higher pressure, so as to open communication from that reservoir to the supply pipe 9.

In operation, if main reservoir pressure is being used in the train, the higher pressure therein operates to shift the double check valve 26 to the position shown in the drawing, so that fluid from the main reservoir 13 flows through pipe 11 and pipe 9 to the exposed area of the under side of the supply valve 16. Fluid also flows through a passage 27, having a restricted portion, to the piston chamber 15 and through passage 22 to the pilot valve chamber 20.

When an emergency application of the brakes is effected, fluid is supplied to the quick action piston chamber 7 through passages 28 and 6 to operate the piston 29 and the brake pipe vent valve 30 in the usual manner and fluid supplied to passage 6 will also flow through pipe 5 to the piston chamber 17 of the pilot valve device. At this time, the chamber below piston 18 is open through passage 31 to a vent port 32 controlled by the limiting valve device, so that the fluid supplied to the piston chamber 17 operates to shift the piston 18 and open the valve 19. Fluid is thereupon vented from piston chamber 15 through passages 22 and 31 to vent port 32 and the reservoir pressure acting on the exposed area of the underside of the supply valve 16 then operates to lift said valve from its seat. The full area of the valve piston 16 being thus exposed to reservoir pressure, the same is promptly shifted to its full open position, and fluid is supplied from the main reservoir 13 to the pipe 2 and the brake cylinder 3. It will be understood that the usual triple valve device or other controlling valve is also supplying fluid to the brake cylinder through a pipe 33 connected to pipe 2 and when the brake cylinder pressure has been built up to the desired maximum pressure by flow from the usual triple or controlling valve device and from the operation of the by-pass and limiting valve device, the adjustment of the limiting valve device is such that this limiting brake cylinder pressure which acts below the valve 23 will be sufficient to overcome the resistance of the spring 24 and thus lift the valve from its lower seat. The full area of the valve 23 is then exposed to brake cylinder pressure and the same promptly moves to its upper seat, shutting off communication from passage 31 to vent port 32. Since fluid is now supplied through passages 27 and 22 to the chamber below the piston 18, the valve 19 being open, the fluid pressure below the piston 18 builds up very quickly, so that the valve 19 will be moved to its closed position by the spring 34. The fluid pressure in piston chamber 15 will in turn quickly build up to reservoir pressure, so that the sping 35 operates to close the supply valve 16 and prevent further admission of fluid to the brake cylinder.

The check valve 21 prevents fluid from the brake cylinder flowing back to the face of the supply valve 16 when there is no pressure in the main reservoir, as in such case the brake cylinder pressure would tend to lift the supply valve off its seat.

If main reservoir pressure is not piped through the train, then the emergency reservoir pressure can be used, since the double check valve 26 will automatically shift over, so as to open communication from the emergency reservoir 14 through pipe 12 to the supply pipe 9. In this case, the operation of the apparatus will be the same as that described in connection with the main reservoir except that the emergency instead of the main reservoir, supplies fluid to the by-pass valve.

It will now be evident that with the apparatus hereinbefore described, the same maximum brake cylinder pressure is obtained in an emergency application of the brakes, regardless of the brake pipe pressure which may be carried.

Having now described my invention, what I claim as new and desire to secure by Letters Patent, is:

1. In a fluid pressure brake, the combination with a brake cylinder, of a valve mechanism for supplying fluid to the brake cylinder in an emergency application of the brakes in addition to that supplied by the usual brake controlling apparatus to provide the same maximum brake cylinder pressure at different degrees of pressure carried in the brake system.

2. In a fluid pressure brake, the combination with a brake cylinder, of a valve mechanism for supplying fluid to the brake cylinder in an emergency application of the brakes in addition to that supplied by the usual brake controlling apparatus to provide the same maximum brake cylinder pressure regardless of the degree of brake pipe pressure which may be carried in the system.

3. In a fluid pressure brake, the combination with a brake cylinder, of a valve mechanism for supplying fluid to the brake cylinder in an emergency application of the brakes in addition to that supplied by the usual brake controlling apparatus and comprising a brake cylinder supply valve, means operating in an emergency application of the brakes for opening said valve, and a limiting valve device operating at a predetermined degree of brake cylinder pressure for effecting the closure of said supply valve.

4. A by-pass and limiting valve device for supplying fluid to the brake cylinder, comprising a supply valve, a pilot valve device operated upon an emergency application of the brakes for varying the fluid pressure on the supply valve to open same, and a limiting valve device operated at a predetermined brake cylinder pressure for effecting the operation of the pilot valve device to close the supply valve.

5. A by-pass and limiting valve device for supplying fluid to the brake cylinder, comprising a valve piston for supplying fluid to the brake cylinder, a pilot valve device operated upon an emergency application of the brakes for venting fluid from said valve piston to open same, and a limiting valve device operated at a predetermined maximum brake cylinder pressure for effecting the operation of the pilot valve device to cut off the venting of fluid from the valve piston and thereby permit the valve piston to close.

6. The combination with a quick action valve device operated in an emergency application of the brakes by admitting fluid under pressure thereto, a valve piston for supplying fluid to the brake cylinder, a pilot valve device operated by the fluid which operates the quick action valve device for venting fluid from said valve piston to open same, and a limiting valve device operated at a predetermined maximum brake cylinder pressure for equalizing the fluid pressures on opposite sides of the pilot valve device to permit same to close and thereby effect the closure of the supply valve piston.

7. The combination with a by-pass valve device for supplying fluid from a source of supply to the brake cylinder, of two sources of fluid pressure supply for said by-pass valve device and a double check valve device operated by fluid from the source having the higher pressure for opening communication from said source to the by-pass valve device.

8. The combination with a by-pass valve device for supplying fluid from a source of supply to the brake cylinder, of two sources of fluid pressure supply for said by-pass valve device and a double check valve device operated by the pressure of fluid from that source having the higher pressure for opening communication from said source to the by-pass valve device and for closing communication to the other source.

9. The combination with a by-pass valve device for supplying fluid from a source of supply to the brake cylinder, of a main reservoir, an emergency reservoir, and a double check valve device operated by the pressure of fluid from that reservoir having the higher pressure for opening communication from said reservoir to the by-pass valve device.

In testimony whereof I have hereunto set my hand.

WALTER V. TURNER.

Witnesses:
A. M. CLEMENTS,
BARBARA HERBERT.